United States Patent

Moss et al.

[15] 3,676,610

[45] July 11, 1972

[54] MAGNETIC HEAD WITH MODIFIED GRAIN BOUNDARIES

[72] Inventors: Herbert Irwin Moss, Yardley, Pa.; Eric Francis Hockings, Princeton, N.J.

[73] Assignee: RCA Corporation

[22] Filed: April 3, 1970

[21] Appl. No.: 25,935

[52] U.S. Cl. ..........................179/100.2 C, 75/125, 148/104

[51] Int. Cl. ....................G11b 5/14, C22c 39/04, H01f 1/02

[58] Field of Search .....................179/100.2 C; 340/174.1 F; 346/74 MC; 148/104, 105

[56] References Cited

UNITED STATES PATENTS 2,992,474 7/1961 Adams et al. ...................179/100.2 C

*Primary Examiner*—Bernard Konick
*Assistant Examiner*—Robert S. Tupper
*Attorney*—Edward J. Norton

[57] ABSTRACT

There is provided a transducing, magnetic head for use in magnetic recorder-reproducer systems. The head is fabricated of a material which consists of a majority or first phase of polycrystalline, small grained magnetic alloy which has an abrasion resistant second phase disposed in the grain boundaries throughout the alloy. The volume percent of the first and second phase materials are arranged to provide desired electrical and magnetic performance with prolonged head life through increased resistance to wear.

11 Claims, 2 Drawing Figures

INVENTOR.
Herbert I. Moss and
Eric F. Hockings
BY James B. Hayes
ATTORNEY

MAGNETIC HEAD WITH MODIFIED GRAIN BOUNDARIES

The magnetic record-playback heads used with magnetic tape systems, particularly, in video recorders are a small but vitally important component in determining total system performance. Good performance at high frequencies depends upon several factors: a very short magnetic gap; close spacing between tape and head; and a high relative velocity between tape and head. To achieve the close spacing between tape and head, the tape is in direct physical contact with the head. This leads to considerable head wear because of the abrasive action between tape and head, which in turn limits head life.

Presently many magnetic heads are fabricated from an alloy known as Alfecon or Sendust consisting primarily of iron, silicon, and aluminum. This material is prepared by a vacuum-melting and casting process in which the final average grain size is about 350 microns. The abrasive action which takes place between tape and head typically limits these heads to approximately 150 hours of useful life.

It is therefore an object of the present invention to provide an improved magnetic head which exhibits increased resistance to wear, and hence longer life, and exhibits little or no degradation in desired magnetic properties.

Briefly, this is accomplished by the provision of a magnetic alloy material in the form of one of the many known geometric shapes used for magnetic transducing heads. The alloy or first phase material is comprised of particles having a grain boundary structure which includes a second phase material. The second phase is integrally joined in the grain boundary surfaces of the particles of the first phase. The second phase, which is more wear resistant than the first phase, may be present in the form of an oxide of the alloy and/or another magnetic or non-magnetic material.

Figure 1:
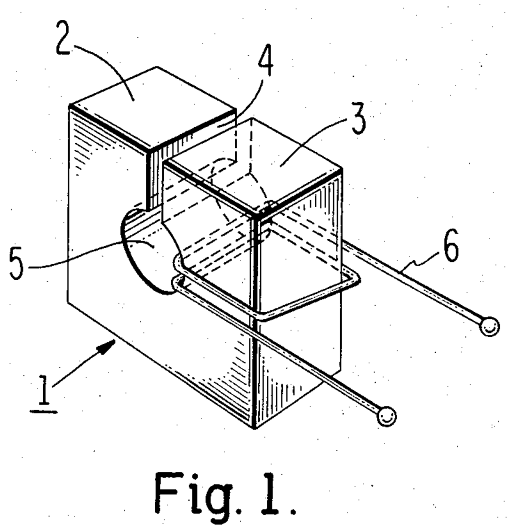
FIG. 1 is a perspective view, exemplifying one transducer head configuration with energizing coil which is useful in practicing the invention.

In FIG. 1 there is shown a magnetic transducer 1, having pole pieces 2 and 3 arranged in confronting relation to form a gap 4. The width of the gap 4 for video record-playback applications may, for example, be in the range of 1–5 microns. An aperture 5 is provided through the transducer to facilitate the location of a coil or winding 6 for energizing the transducer 1. The geometric configuration of the transducer head or core of FIG. 1 is by way of example only. The invention and hence further discussion is directed to the material from which the transducer is formed.

A feature of the material of the invention to be discussed involves decreasing the grain size of a first phase material thus increasing the grain boundary area. An effective increase in material hardness might be expected due to the increased hardness that is usually observed in the vicinity of grain boundaries in a polycrystalline material. A further contribution to effective material hardness arises when a hard, more abrasion-resistant second phase is incorporated into the grain boundaries of the first phase material.

A phase may be defined as a homogeneous portion of matter that is physically distinct and mechanically separable. The first or primary phase is that phase which is present to the greatest extent, while the second phase makes up less than fifty percent of the total volume.

In the arrangement of material for magnetic heads to be discussed, it is preferable that the second phase is present predominantly in the grain boundaries between adjacent grains of the primary phase rather than in the interior of the grains of the first phase. The presence of the second phase may be as small, hard, discontinuous, randomly distributed particles or gains of a separate second material in a continuous first phase matrix of the magnetic alloy or a thin layer of an oxide of the first phase substantially surrounding each grain of the first phase matrix.

Throughout the discussion of the transducer head material of the invention the first or primary phase material is a magnetic alloy. A preferred embodiment is presented describing the use for the first phase of ternary alloys of iron, silicon and aluminum of weight percent ranges which include the magnetic alloys more specifically known as Sendust and Alfecon. However other magnetic alloys which should be suitable for the first phase material are: binary alloys of iron - nickel having for example 45–75 wt.% nickel, which are known as Permalloy; binary alloys of iron-aluminum with up to 16 wt.% aluminum, for example Alfenol; ternary alloys of iron-nickel-copper with for example 77 wt.% nickel, 5 wt. % copper and the balance iron, an example of which is known as Mumetal; quaternary alloys of iron-nickel-copper-molybdenum with for example 77 wt.% nickel, 5 wt.% copper, 4 wt.% molybdenum and the balance iron.

The term "effective hardness" is used to describe the actual wear resistance of a fabricated magnetic head when in contact with a magnetic tape material, since there may be only a small measurable difference in hardness between heads of different wear properties when tested with a standard laboratory hardness testing device, such as a Rockwell Hardness Tester.

One method of providing the required second phase grain boundary material is to permit the magnetic alloy to oxidize during the process of particle size reduction prior to consolidation. The oxide is harder and more abrasion-resistant than the alloy. This will be described in more detail later. A second phase material, other than that formed by oxidation, may be added to the magnetic alloy material in the form of very small particles and allowed to segregate in grain boundaries during consolidation. The second phase, whether added in the form of small particles or by oxidation, must meet at least three requirements. The quantity of second phase grain boundary material, i.e. the volume percent, must not be so great as to adversely influence the magnetic properties of the head. For video signal transducer applications the particle size of the second phase material preferably should not exceed for example 0.1 micron, so that any grain boundaries which may occur in the gap area do not alter gap definition. The second phase material must not adversely react with the magnetic alloy, at least up to the consolidation temperature, so that the magnetic properties of the magnetic alloy are not degraded. Examples of hard, abrasion-resistant second phase materials which may be used, are certain carbides, oxides and silicides such as silicon carbide, tungsten carbide, aluminum oxide, zirconium oxide, and iron silicide.

A method is herein described for consolidating the magnetic alloy containing the dispersed second phase material. The method used to effect this consolidation or densification, includes what is known in the prior art as hot-pressing or pressure-sintering. The hot-pressing technique permits the attainment of almost theoretically dense material with essentially no grain growth.

Hot pressing of magnetic ceramic materials such as, ferrite, for magnetic head purposes is known in the art. The prior art, however, points out that a final average grain size greater than 30 microns, and preferably 50 microns or greater, must be obtained to achieve a desirable decrease in wear of video magnetic heads.

By contrast it has been found that a decrease in the average grain size of a magnetic alloy of iron, aluminum and silicon and incorporation of a hard abrasion resistant second phase in the grain boundaries, has decreased wear of the transducer. In the case of ferrite transducers, hot pressing is used to circumvent certain problems inherent in the use of single crystal ferrite such as, difficulty of growing single crystal ferrite with proper stoichiometry, limited composition of ferrite, and magnetic and mechanical anisotropy.

One embodiment of the magnetic head material of the invention will now be described which includes the preparation of a ternary magnetic alloy of iron, silicon and aluminum and attrition of the alloy to particle size less than a given size, for example 44 microns. The formation of a surface coating of oxide on the individual alloy particles or grains is preferably effected during the attrition. If the second phase is to be added in the form of hard, abrasion-resistive particles, it is also preferably accomplished following the attrition. The final body of material for the transducer is then produced by hot-pressing.

The magnetic alloy is prepared by a known vacuum-melting and ingot casting process, from the constituent elements in the proper proportion, to give the most desirable magnetic properties. Suitable weight percent ranges for the iron, silicon, aluminum alloy of the first phase are 6–12 percent silicon, 4–9 percent aluminum and the balance substantially iron, the combined silicon and aluminum constituting a maximum weight percent of about 17 percent of the alloy mixture. However for descriptive purposes of a preferred embodiment the composition utilized for the first phase is 85.3 weight percent iron, 9.5 weight percent silicon, and 5.2 weight percent aluminum which is known as Alfecon. The outside surface of the ingot is ground away to remove any impurities introduced from the mold. The cast ingot is then cut into slices approximately 0.1 inch thick. The slices of Alfecon alloy of the presently described embodiment are cleaned in concentrated hydrochloric acid for several minutes, rinsed, and dried. These slices are then broken-up in a steel mortar and pestle to pass through a 20 mesh screen (840 microns). The alloy material is then placed in a ball mill preferably of steel with steel balls and milled in the presence of an organic solvent such as ethyl alcohol or isopropyl alcohol for a period of for example 12 to 16 hours. After milling, the powder is dried in a vacuum chamber at room temperature. At this point, various particle size ranges are separated by means of sieves. The particle size range used in the preferred embodiment of this invention is less than 20 microns, with the average particle size, for example, 16 microns. However, particle size ranges from 20 to 30 microns and above have been used to provide relative amounts of improved wear of the magnetic heads. Where the second phase is present by oxidation it appears preferable to utilize first phase Alfecon particles or grains of 44 microns or less. Where the second phase is present other than by oxidation, in the form of a hard separate second material the Alfecon grain size is believed to be less critical which would enable improved wear resistance with alloy grains up to 44 microns or greater.

It has been observed that the formation of an oxide layer around each particle of the magnetic alloy takes place during the milling operation, if there is some water present in the organic solvent and/or when the dried powder is exposed to the air. The advantage of introducing the abrasion-resistant material in this manner is that the material is more uniformly distributed around each alloy particle, than if the abrasion-resistant material were added separately and then dispersed throughout the magnetic alloy powder. Preferably the amount of a nonmagnetic second phase should not exceed about 1 volume percent. The determining factor is the magnetic performance of the head structure, i.e., its ability to provide an adequate signal-to-noise ratio and not require excessive drive currents. It is to be noted that if a magnetic material, such as ferrite with a coercivity of no more than 10 Oersted and preferably less than 1 Oersted, is utilized for the second phase, then the volume percent of the second phase may be appreciably in excess of 1 percent.

Another method of introducing the oxide phase is to heat-treat the powder in air at several hundred degrees centigrade after it has been reduced to the desired particle size range. Other methods of material attrition known in the metallurgical or ceramic industry can also be used, provided a means is present to permit the oxide to form or the second phase is added as separate material.

A further operation in the process involves the densification of the powdered Alfecon by means of vacuum hot-pressing or hot-pressing in an ambient of inert gas such as argon. Sufficient Alfecon powder is weighed into a die to provide a completely densified right-cylindrical specimen with a diameter-to-height ratio of about 2. Samples with diameters of 0.5, 1 and 2 inches have been prepared. Die and rams may be constructed of a molybdenum alloy and are heated by means of a molybdenum-would resistance furnace. The die is lined with a tight-fitting cylindrical high purity graphite insert which has a wall thickness of 0.25 inch and an inside diameter of 0.5 inch. Graphite is used as the insert material because of its lubricity, machinability, and inertness toward the Alfecon. The use of a supported graphite die in this fashion permits greater than normal pressures to be used during hot pressing without graphite failure. All graphite dies may also be used provided the wall thickness is sufficient to withstand the pressures employed during hot pressing. An alternative technique of lining the molybdenum die to prevent reaction between the alloy and the die and to permit easy ejection after hot pressing, would be to use a graphite cloth similar to that available from the Union Carbide Corporation and trade-named "Grafoil." The top and bottom ram faces are separated from the Alfecon material by means of 0.075 inch thick graphite or vitreous carbon discs. Here again, graphite cloth could be used. The die is operated in a floating manner to provide more uniform density throughout the sample. The die and furnace are contained in a water-cooled hot-pressing vacuum chamber which can be evacuated to at least $10^{-3}$ Torr. Uniaxial pressure is applied to the top ram by means of a conventional hydraulic press through a bellows sealed plunger.

The actual hot pressing procedure is as follows. The hot press chamber containing the loaded die is evacuated, and the temperature of the die is increased to 600°C and held at this temperature for at least 1 hour. This serves to expel adsorbed gases and moisture from the powder, and assures the attainment of the highest possible density during hot-pressing. The powder is then pressed for approximately 1 minute at a pressure of 15,000 psi. This pressure is then released and a pressure of 2,000 to 3,000 psi is applied while the temperature of the die and its contents is increased to 950°–1,000°C. The rate of heating from 600°C to the hot pressing temperature is about 20°C/minute. A 5-minute soak period at temperature permits thermal equilibration to take place. In the case of samples larger than 0.5 inch in diameter, longer periods of soak time may be needed for thermal equilibration. A pressure of 15,000 psi is then applied for a period of 1 hour. At the end of the 1 hour period the pressure is released, the electric power to the furnace is turned off, and the die is allowed to cool to room temperature.

The resulting sample of densified material is easily ejected from the die by applying a force to the top ram. This sample exhibits a density which is greater than 99.9 percent of the theoretical density. An almost void or pore free material is essential for video magnetic heads to maintain good gap definition during operation and high frequency response. For video applications, a porosity which is no greater than about 1 percent and preferably not greater than 0.1 percent should be provided. From a microscopic examination of a polished and etched surface the presence of a second phase appears to be distributed in the grain boundaries with no grain growth of the first phase. The oxide second phase, which is harder than the magnetic alloy has been observed to result in increased wear for magnetic heads fabricated from this material and used, for example, in quadruplex broadcast video recorders.

Figure 2:
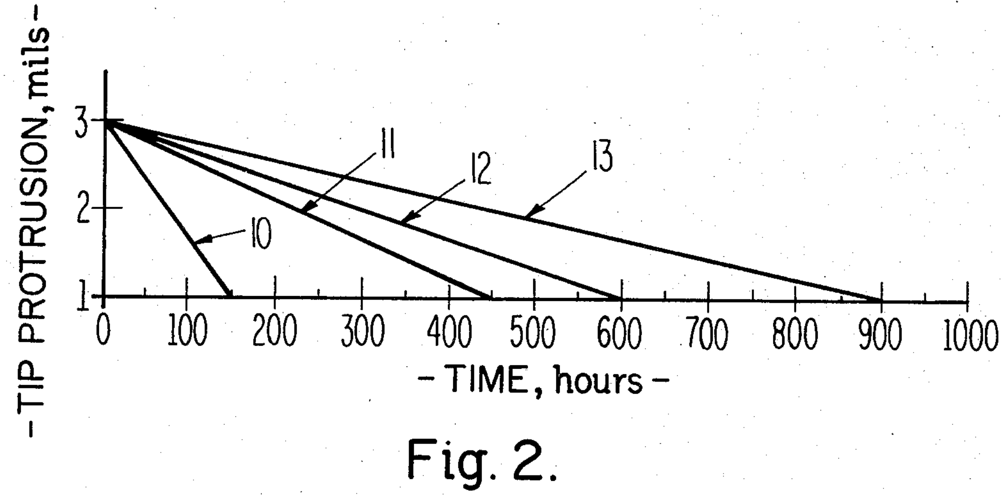
FIG. 2 is a graphic illustration showing relative transducer head wear as a function of operating time.

FIG. 2 shows test results for video heads fabricated from hot pressed Alfecon of various particle size ranges. The plots 11–13 are for Alfecon grain or particle size ranges which are respectively, less than 44 microns, 20–30 microns and 10–20 microns. In FIG. 2, tip protrusion relative to a standard vacuum-cast head is plotted as a function of time when tested in a standard high-frequency color broadcast video tape recorder. The tip protrusion as a function of time for the standard vacuum cast head (plot 10) is also included. The observed decrease in wear as the particle size of the Alfecon is decreased is believed due to an increase in grain boundary area and the concomitant increase in the amount of second phase material exposed on the wear surface of the head. Experiments performed in development of the invention showed, that video heads fabricated from small grained (less than 44 microns, or 10–20 microns) hot-pressed Alfecon in which there is little or no second phase material disposed in the grain boundaries, wear at a rate comparable to heads made from vacuum cast Alfecon material (plot 10, FIG. 2). Thus, there appears to be little or no wear advantage accruing to a head structure fabricated from second phase free Alfecon, formed either by means of a hot press technique or a conventional sintering technique. The iron-aluminum-silicon alloy material fabricated without a second phase addition will exhibit a hardness of about 48 Rockwell C, whereas the same alloy composition containing second phase additions as taught by the present invention will have a hardness of at least 50 Rockwell C. Hot pressed heads with the described first and second phases show little or no degradation in magnetic properties when compared to vacuum cast Alfecon heads. Another advantage inherent in the present invention is the decrease in eddy current losses at high frequencies, due to the electrically insulating character of the second phase material. Eddy currents are dependent upon the frequency of the applied signal and the resistivity of the head material. In the case of the material described, the grain size and the presence of a second-phase material in the grain boundaries serves to increase the resistivity of the Alfecon.

As described, the first phase of the magnetic alloy is subjected to an environment which produces a hard second phase in and about the grain boundaries of the alloy. This may be enhanced by elevated temperatures or treatment in a solution, which accelerates formation of an oxide surface on the alloy particles. It is believed that such procedures for provision of the second phase, produce a predominantly chemical formation and bond between the first and second phase materials. This formation appears to afford greater coherency with and bonding to the individual first phase particles, and somewhat uniform distribution of the second phase. The second phase may also be in the form of a physical addition or dispersion of a separate small particle second material in the grain boundaries throughout the magnetic alloy. If such a second phase is substantially inert, it is believed the particles are held physically in the densified structure by means of irregularities of the particles or grain surfaces of the alloy and/or second phase. If the second phase is not completely inert with respect to the alloy, chemical bonding to the alloy grains in addition to physical bonding appears to take place.

In the preferred embodiment hot pressing parameters of temperature, pressure, and time have been described for making wear resistant head material including a first phase of Alfecon. Other combinations of temperature, pressure, and time can be used to hot press the particles to substantially theoretical density. For example, a temperature of 850°C at 15,000 psi for 1 hour will also generate a fully dense body, as will 950°C and 7500 psi for one hour. A hot pressing temperature of 750°C would require about 6 hours at 15,000 psi, whereas Alfecon powder subjected to a temperature and pressure of 1,050°C and 7,500 psi, respectively, would require 5 to 10 minutes to reach full density. The above hot pressing parameters pertain to a cylindrical sample 0.5 inch in diameter and 0.25 inch high. Larger diameters and/or higher samples may require greater pressures because of the increased friction between sample and die wall.

Another technique of hot pressing which may also be used to facilitate the densification of powdered magnetic alloy is to cold press the alloy into a suitable shape, embed the cold pressed body in small particle size inert powder which is contained in a suitable die, and then apply heat and pressure, the pressure being transmitted to the alloy by means of the inert powder.

Still another technique is one which results in many hot pressed bodies in the form of thin sheets. The production of thin sheets of magnetic alloy rather than a single cylindrical sample which may be 1 or 2 inches thick has at least two advantages; the elimination of the slicing operation to form thin shapes for subsequent head fabrication and less waste of alloy material. One method of hot pressing thin sheets is as follows. A graphite lined die is prepared and a disc of 0.005 or 0.010 inch thick graphite foil is placed against the face of the bottom ram. Sufficient magnetic alloy powder is weighed into the die to give the desired thickness of densified material. This powder is leveled and pressed at several thousand pounds per square inch. A second disc of graphite foil is now placed on top of the alloy, and the loading process is repeated. The layering of alloy and graphite foil can be continued until the total height is approximately one-half the diameter of the specimens. Hot pressing this arrangement then follows the procedure described above for a single specimen. The presence of the graphite foil between each magnetic alloy sheet permits easy separation of the sheets when the assembly is removed from the die. This process results in many thin sheets of densified magnetic alloy whose thickness may be as thin as 0.020 inch. Following the formation of a sample of the material as described, the material is cut and finished by known techniques in the form of a desired transducer head geometry such as shown in FIG. 1.

What is claimed is:

1. A magnetic transducer head including an effective working gap of given dimensions comprising a body fabricated from a first phase magnetic alloy material formed of grains with each of said grains having a size lying within a first range, a further material which is substantially inert with respect to the magnetic properties of said alloy providing a second phase formed of grains whose respective sizes lie in a second range, with the average of the sizes of the grains of said second phase being less than the average of the sizes of the grains of said first phase, the grains of said second phase forming less than 50% of the volume of said body and being disposed in and intimately joined with the peripheral grain boundary surface of each of the grains of said first phase material, said second phase material having hardness and abrasion resistant properties which exceed that of said first phase material and said body having a porosity no greater than one percent by volume with a maximum pore dimension less than the given dimensions of said working gap.

2. The invention according to claim 1, wherein the first phase alloy constituents are iron, silicon and aluminum which are present in the respective weight percent ranges of 6–12 percent silicon, 4–9 percent aluminum and the balance substantially iron, wherein the combined silicon and aluminum constituting a weight percent no greater than 17 percent of the alloy mixture and wherein said body exhibits a physical hardness of at least 50 Rockwell C.

3. The invention according to claim 1, wherein said first phase alloy is selected from the group consisting of binary alloys of iron and nickel having in the range of 45–75 weight percent nickel, binary alloys of iron and aluminum with up to 16 weight percent aluminum, ternary alloys of iron, silicon and aluminum with 6–12 weight percent silicon, 4–9 weight percent aluminum and the balance substantially iron, ternary alloys of iron, nickel and copper with substantially, 77 weight percent nickel, 5 weight percent copper and the balance iron, quaternary alloys of iron, nickel, copper and molybdenum with substantially, 77 weight percent nickel, 5 weight percent copper, 4 weight percent molybdenum and the balance iron.

4. A magnetic transducer head including a body having first and second portions arranged in confronting relation to define a transducing gap with a given dimension therebetween, said body comprising: a magnetic alloy of iron, silicon and aluminum formed of grains of a size no greater than 44 microns to provide a first phase, a further material which is substantially inert with respect to the magnetic properties of said alloy, said further material providing a second phase formed of grains of a size less than the said given gap dimension, the grains of said second phase forming less than 50 percent of the volume of said body and being disposed in and intimately joined with the peripheral surface of each of the grains of said first phase material, said second phase material having hardness and abrasion resistant properties which exceed that of said first phase material and wherein said body has a porosity less than one percent by volume with a maximum pore dimension less than said given gap dimension.

5. The invention as defined in claim 4, wherein; said second phase material is complex oxide of said first phase.

6. The invention according to claim 4, wherein; said second phase material is comprised of a hard abrasion resistant non-magnetic oxide of a metal.

7. The invention according to claim 4 wherein, said second phase material is comprised of a hard abrasion resistant non-magnetic carbide of a metal.

8. The invention according to claim 4 wherein, said second phase material is selected from the group consisting of silicon carbide, tungsten carbide, aluminum oxide, and zirconium oxide.

9. The invention according to claim 4, wherein said second phase is held in the grain boundaries of said first phase by surface irregularities of at least one of said first and second phases.

10. The invention according to claim 4, wherein said second phase is held in the grain boundaries of said first phase by chemical bonding between said first and second phase materials.

11. A magnetic transducer head comprising a body of material formed of grains of a first phase magnetic alloy of 6–12 weight percent silicon, 4–9 weight percent aluminum and the balance substantially iron, wherein the combined silicon and aluminum constitute a weight percent no greater than 17 percent of the alloy, the size of the grains of said first phase alloy being no greater than 20 microns, a second phase material which is substantially inert with respect to the magnetic properties of said alloy disposed in the grain boundaries throughout said first phase, said second phase being grains no greater than one micron of a complex oxide of said alloy with said second phase forming no greater than one volume percent of said body and said body having a porosity no greater than one percent by volume.

* * * * *